(12) United States Patent
Sen

(10) Patent No.: US 7,406,694 B2  
(45) Date of Patent: Jul. 29, 2008

(54) METHOD AND SYSTEM FOR TRACKING KERNEL RESOURCE USAGE

(75) Inventor: Ranjan K. Sen, North Bethesda, MD (US)

(73) Assignee: Microsoft Corporation, Redmond, WA (US)

( * ) Notice: Subject to any disclaimer, the term of this patent is extended or adjusted under 35 U.S.C. 154(b) by 531 days.

(21) Appl. No.: 10/600,977

(22) Filed: Jun. 20, 2003

(65) Prior Publication Data

US 2004/0261081 A1    Dec. 23, 2004

(51) Int. Cl.  
*G06F 9/54* (2006.01)  
*G06F 9/00* (2006.01)

(52) U.S. Cl. ........................ 719/313; 718/104

(58) Field of Classification Search ................. 719/313; 718/104–105  
See application file for complete search history.

(56) References Cited

U.S. PATENT DOCUMENTS

| | | | |
|---|---|---|---|
| 4,718,008 A | 1/1988 | Chang et al. | |
| 4,730,249 A | 3/1988 | O'Quin, II et al. | |
| 4,742,447 A | 5/1988 | Duvall et al. | |
| 5,414,812 A | 5/1995 | Filip et al. | |
| 5,463,775 A | 10/1995 | DeWitt et al. | |
| 5,485,409 A | 1/1996 | Gupta et al. | |
| 5,491,819 A | 2/1996 | Fatzinger et al. | |
| 5,572,672 A | 11/1996 | Dewitt et al. | |
| 5,638,539 A | 6/1997 | Goti | |
| 5,748,980 A | 5/1998 | Lipe et al. | |
| 5,802,590 A * | 9/1998 | Draves | 711/164 |
| 5,870,763 A | 2/1999 | Lomet | |
| 5,875,330 A | 2/1999 | Goti | |
| 5,933,838 A | 8/1999 | Lomet | |
| 5,946,698 A | 8/1999 | Lomet | |
| RE36,462 E | 12/1999 | Chang et al. | |
| 6,038,538 A | 3/2000 | Agrawal et al. | |
| 6,049,798 A | 4/2000 | Bishop et al. | |
| 6,067,550 A | 5/2000 | Lomet | |
| 6,151,607 A | 11/2000 | Lomet | |
| 6,163,855 A | 12/2000 | Shrivastava et al. | |
| 6,178,529 B1 | 1/2001 | Short et al. | |
| 6,182,086 B1 | 1/2001 | Lomet et al. | |
| 6,216,212 B1 | 4/2001 | Challenger et al. | |
| 6,243,825 B1 | 6/2001 | Gamache et al. | |
| 6,256,712 B1 | 7/2001 | Challenger et al. | |
| 6,360,331 B2 | 3/2002 | Vert et al. | |
| 6,401,120 B1 | 6/2002 | Gamache et al. | |
| 6,449,734 B1 | 9/2002 | Shrivastava et al. | |
| 6,453,426 B1 | 9/2002 | Gamache et al. | |
| 6,490,594 B1 | 12/2002 | Lomet | |
| 6,507,875 B1 | 1/2003 | Mellen-Garnett et al. | |
| 7,028,298 B1 * | 4/2006 | Foote | 718/104 |
| 2002/0059425 A1 | 5/2002 | Belfiore et al. | |
| 2006/0095919 A1 * | 5/2006 | Shiomi et al. | 718/104 |

* cited by examiner

*Primary Examiner*—Meng-Ai An  
*Assistant Examiner*—Abdou K Seye  
(74) *Attorney, Agent, or Firm*—Marshall, Gerstein & Borun LLP

(57) ABSTRACT

A method and computer system for tracking kernel resource usage is disclosed that tracks kernel resources allocated to user processes called from the user level of the operating system. A tag of the user processes is generated, which allows a way to identify the user processes and associate allocated kernel resources to the user process. As a result, the user processes can be charged for kernel resources.

9 Claims, 7 Drawing Sheets

| TAGS | ALLOCATED KERNEL RESOURCES | TYPE OF KERNEL RESOURCES ALLOCATED |
|---|---|---|
| 1 | TAG VALUE FOR USER PROCESS INCLUDING RESOURCE TYPE | BYTES USED | GDI HANDLES |
| | USER PROCESS ID | | |
| 0 | TAG VALUE FOR KERNEL PROCESS INCLUDING KERNEL PROCESS ID | BYTES USED | N/A |
| 1 | TAG VALUE FOR USER PROCESS INCLUDING RESOURCE TYPE | BYTES USED | THREAD HANDLES |
| | USER PROCESS ID | | |

FIG. 4

METHOD AND SYSTEM FOR TRACKING KERNEL RESOURCE USAGE

FIELD OF THE INVENTION

The present invention relates generally to computer systems. More particularly, the present invention relates to a method and computer system for tracking kernel resource usage.

BACKGROUND OF THE INVENTION

Operating systems ("OSs") are generally divided into two levels of operations, specifically a user level and a kernel level. To distinguish the processes of the user level and the kernel level, a process called from the user level will be referred to as a "user process," and a process called from the kernel level will be referred as a "kernel process." A user process generally relates to a user-related process, such as editing a document using an editor (e.g., Microsoft Word®), while a kernel process relates to an OS-related process, such as a driver. Both the kernel process and the user process periodically request kernel resources, such as kernel pool memory or kernel pool resource. The current Windows® operating system provides a way to tag a driver that has been allocated kernel resources. The tag information can then be used to track kernel resource usage between different kernel processes. Moreover, in the Windows® operating system, although the Windows Performance, Logging, and Task Manager services track resource usage from a user process, these services do not provide any information about the usage of the kernel pool resources by the user processes. This is so due to the non-availability of mechanisms to gather information about user process usage of the kernel pool resources.

SUMMARY OF THE INVENTION

The kernel resource tracking system disclosed herein addresses the absence of tracking user process usage of the kernel resources.

In embodiments of the present invention, a tag relating to a user process allocated with kernel resources is generated that identifies the allocated resources. With the use of tags for user processes, valuable information relating to the usage of kernel resources is maintained. Resource management can be improved based on such information.

More particularly, the present invention is directed to a method and computer system for tracking kernel resource usage that includes a step of a tag being generated to identify kernel resources allocated to a user process. The tag is flagged as a user process called from the user level to distinguish between a kernel process request and a user process request. A user process identifier is also included for the tag to identify the user process. The user process identifier associates allocated kernel resources with the user process.

Additional aspects of the invention are made apparent by the following detailed description of illustrative embodiments that proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 4 is a block diagram depicting an exemplary data structure of the table shown in FIG. 2;

DETAILED DESCRIPTION OF THE DRAWINGS

Figure 1:
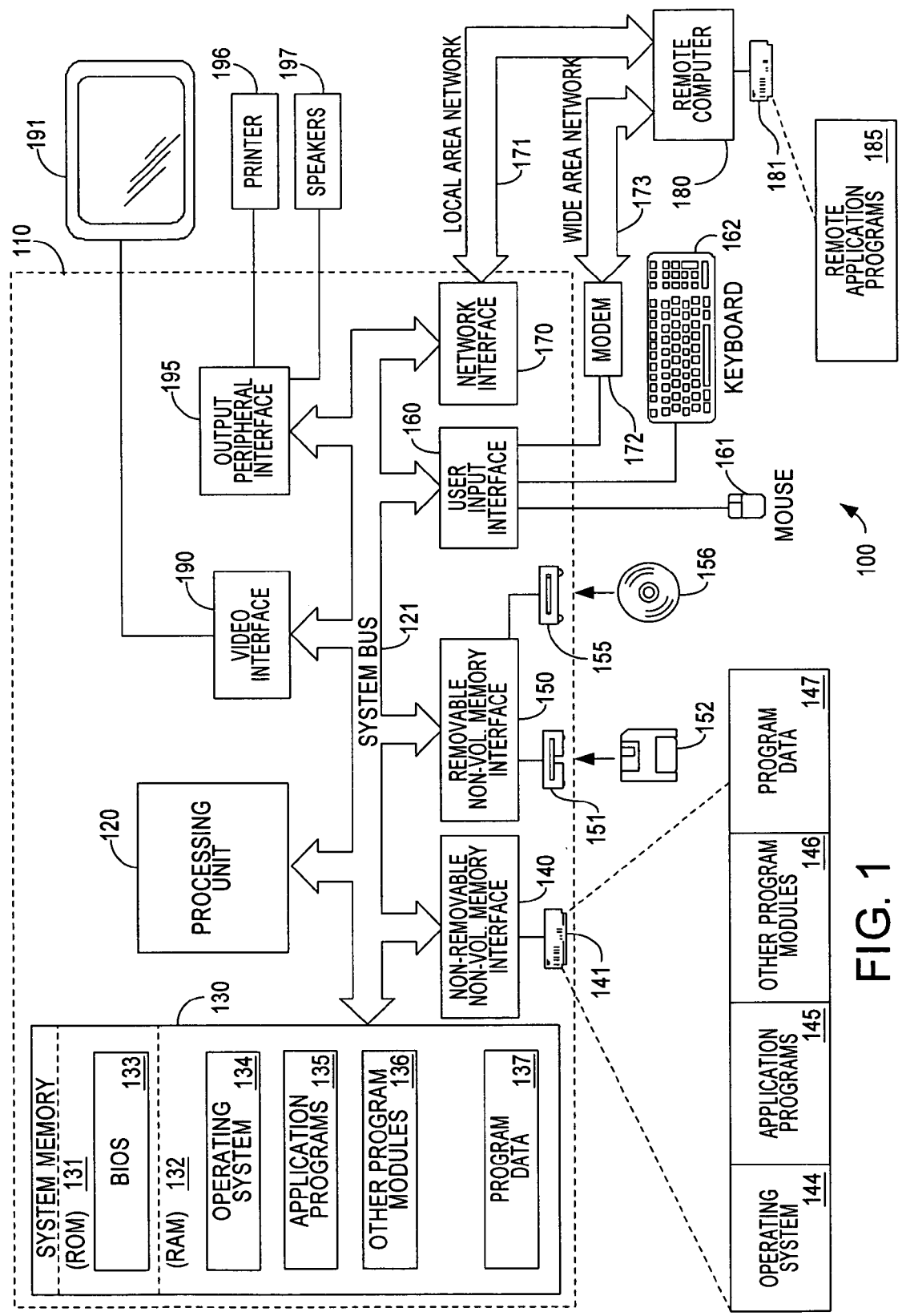
FIG. 1 is a block diagram depicting an exemplary computer system for carrying out an embodiment of the invention.

In embodiments of the present invention, a tag relating to a user process allocated with kernel resources is generated to identify the kernel resources allocated to the user process. The tag is flagged as a process either from the kernel level or user level. In addition, an identifier saved to the tag associates the allocated kernel resources with the process. The present invention provides a way to track processes from the kernel level and the user level.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures, where data are maintained, are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention allows the user processes using kernel resources to be tracked. FIG. 1 illustratively depicts an example of a suitable operating environment 100 for carrying out tracking functionality of kernel resources in accordance with the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, hand-held computing devices, multiprocessor systems, microprocessor-based systems, network PCs, minicomputers, mainframe computers, distributed computing environments that include any of the above systems or devices, and the like.

The invention is described in the general context of a set of steps and processes carried out by computer-executable instructions, such as program modules, being executed by a computer. Generally, program modules include routines, programs, objects, components, data structures, etc. that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is sometimes stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through a output peripheral interface 190.

The computer 110 potentially operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
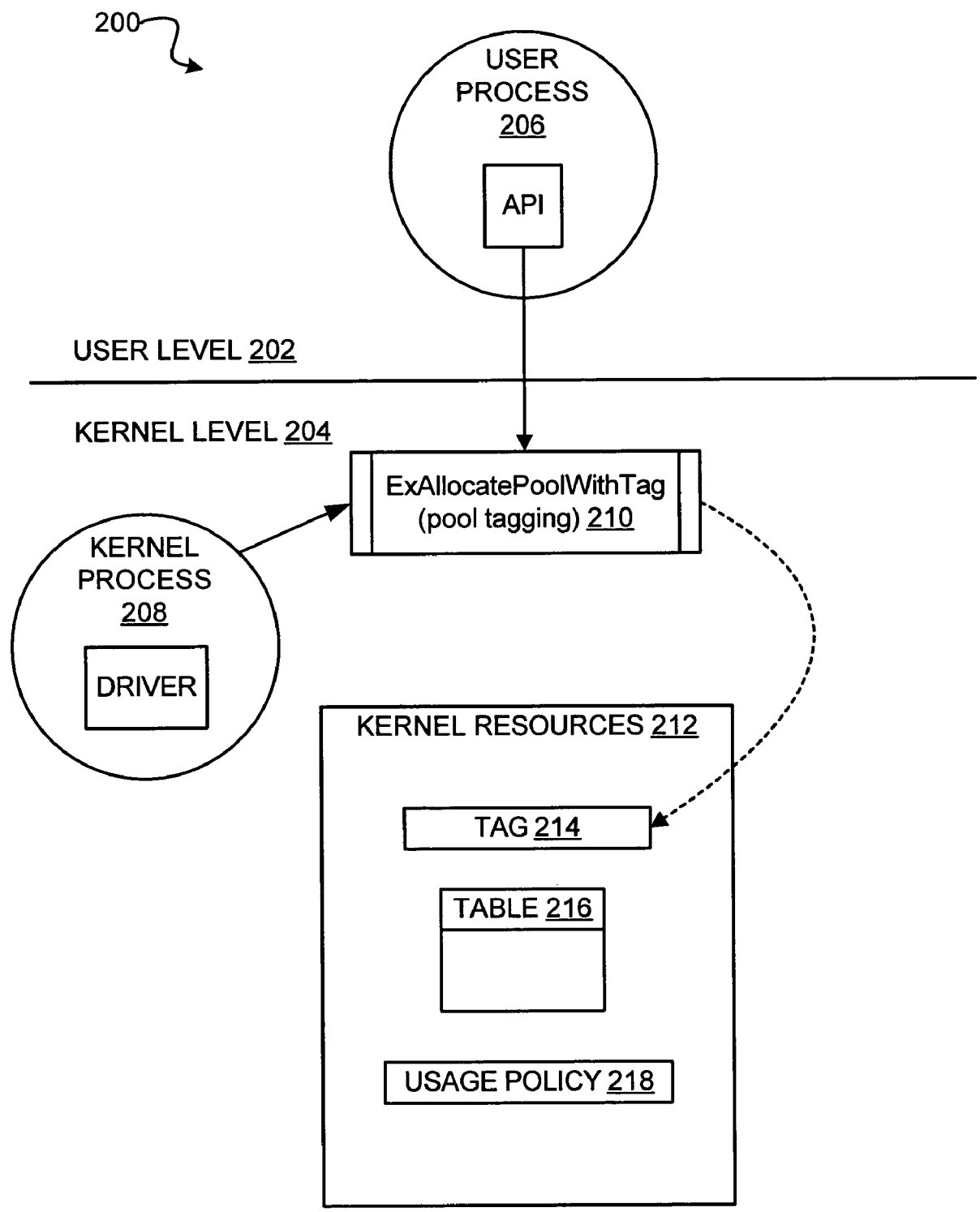
FIG. 2 is a high level schematic diagram depicting computer modules for carrying out an embodiment of the invention.

FIG. 2 illustratively depicts an exemplary system of computer modules, indicated generally at 200, for carrying out the present invention in a Windows® operating system environment. It should be noted that the present invention contemplates implementations with other computer operating systems, such as Unix, Linux, and MacOS®. Although only the Windows® operating system implementation is used as an example to describe the present invention, one skilled in the art would appreciate alternate embodiments with implementations in other operating systems.

The Windows® operating system is divided into two levels of operations, specifically a user level 202 and a kernel level 204. As an example, only two processes are shown, specifically a user process 206 and a kernel process 208, but there are generally multiple processes running in each of the levels at any given time. The user process 206, such as a user level application program interface ("API"), is called from the user level 202, while the kernel process 208, such as a driver, is called from the kernel level. In the Windows® operating system, a kernel function "ExAllocatePoolWithTag" 210 is called to allocate kernel resources 212 of a specified type, such as kernel pool memory. The function 210 returns a pointer to the allocated block. In particular, the "ExAllocatePoolWithTag" function 210 generates a tag 214 that includes information relating to the requesting process and the allocated kernel resources. The tag 214 helps to keep track of the kernel resource allocation and the processes using the allocated kernel resources. The tags can then be stored in a table 216, such as a hash table, to account for kernel resource usages. Such information is useful for building improved resource management by implementing, for example, a usage policy 218 of the kernel resources.

Since the "ExAllocatePoolWithTag" function 210 already generates existing tags for drivers, the function and the existing tag are modified to implement the present invention. It should be noted that the "ExAllocatePoolWithTag" function 210 is used only as an example, and other functions, depending on the specific operating system or network system, can also be used and modified in accordance with embodiments of the present invention. As a result, the above-described computer module system 200 is exemplary. As those skilled in the art will readily appreciate, the present invention, enabling a programmer to track kernel resource usage, can be incorporated into a variety of system components and modules. Thus, the present invention is not limited to any particular computer system or environment shown.

Figure 3A:
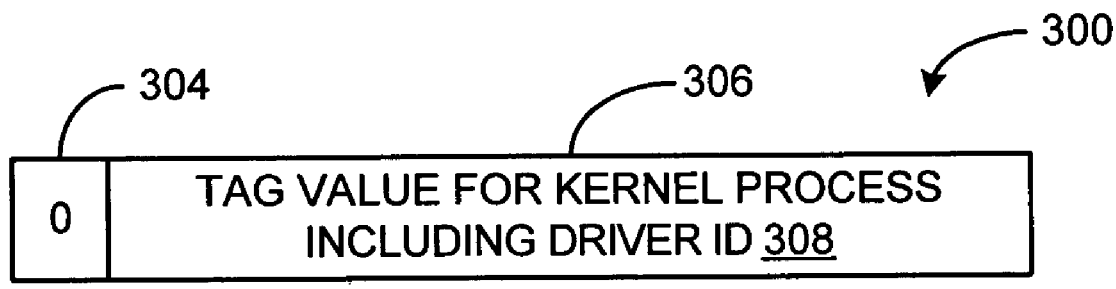
FIG. 3A is a block diagram depicting an exemplary data structure for a tag of a kernel process according to an embodiment of the present invention.
Figure 3B:
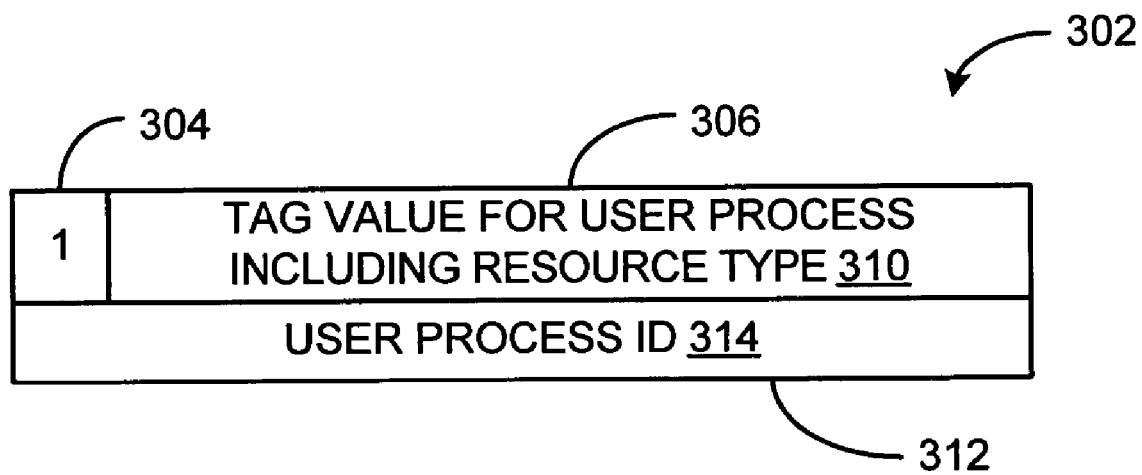
FIG. 3B is a block diagram depicting an exemplary data structure for a tag of a user process according to an embodiment of the present invention.

Turning to FIGS. 3A and 3B, an exemplary data structure for the tag 214 of a kernel process and a user process is respectively shown and indicated at 300 and 302. In this example, a particular type of information about the process, specifically the process identifier, is included with the tag. However, other types of information, such as an application name or a user identifier, can also be included. For example, rather than the process allocated with the kernel resources being identified with the tag, a login user, a group of users, or an account of the user using the process allocated with the kernel resources can be tagged instead. Any information that helps in identifying the account to be charged can be included with the tag. In other words, the present invention can be implemented to keep account of any consumer of the resource to help control and manage its usage. As another example, when a user of resource usage is being tracked or charged, the tag can include the name of the user. Thus, the present invention is not limited to the shown embodiment of identifying the process, because other information are contemplated and readily appreciated by one skilled in the art. Thus, depending on the type of information desired, other implementations are within the scope of the present invention.

In the present example, since two types (e.g., a kernel process request and a user process request) of tag 214 are now generated by the "ExAllocatePoolWithTag" function 210, a most significant bit ("MSB") 304, which is generally the first or leftmost bit, of the tag is used to distinguish between the kernel process and the user process. In this example, the MSB 304 is set to a "0" bit to indicate a kernel process, and conversely a "1" bit is set to indicate a user process. However, as is well known in the art, the MSB 304 of a kernel process can also be set to a "1" bit, while the MSB of a user process is set to a "0" bit. Furthermore, there are other alternative implementations to flag the tag as a kernel process or a user process, including placing such tags in respective dedicated data structures or locations, which are also readily appreciated by one skilled in the art.

As shown in FIG. 3A, the kernel process tag 300 includes only a first word 306. In the first word 306 of the tag 300, a tag value for the kernel process 308 that includes a driver identifier, which runs in a kernel process, is saved after the MSB 304. The tag value charges the kernel process with the allocated kernel resources, while the driver identifier helps to identify the kernel process requesting the allocated kernel resources. From a mapping of the tag to the driver identifier, the identification of the kernel process can be easily obtained. This data structure of the kernel process tag 300 is similar to the existing tag, except for the MSB 304 being set to indicate the tag as a request from a kernel process. Other implementations, such as saving a kernel process identifier to the tag value, are also possible, but to implement the present invention with minimum modification of the current configurations of the Windows® operating system, the kernel process tag preferably remains similar to the existing tag.

Turning now to the data structure of the user process tag 302 shown in FIG. 3B, the tag 214 is extended to include a second word 312. In this embodiment, following the MSB 304, a tag value for the user process 310 is saved in the first word 306 that includes the type of kernel resources allocated (e.g., GDI handles, File objects, Thread objects, etc.) to the user process requesting the kernel resources. Specifically, the type of kernel resources allocated is encoded in the tag value. Similar to the kernel process tag, the tag value is used to charge the user process with the allocated kernel resources, while the kernel resource type encoded in the tag value identifies the type of kernel resources that was allocated to the user process. Next, using the extended second word 312 of the tag 302, a user process identifier 314 is saved to identify the user process. As shown, the present data structure requires only slight modification to the existing tag, making it either one or two word(s) in length depending upon whether the tag pertains to a kernel or user process. This makes the invention easy to incorporate and be backward compatible with a legacy tagging mechanism. It is apparent that minimum modification to any related functions of the existing tagging data structure in the Windows® operating system is needed to accommodate the data structure shown. For other operating systems, the data structure may need either to be built altogether. One skilled in the art would readily appreciate that the preferred data structure can be altered, depending on the operating system or the configuration of the network. Thus, the data structure is not limited to FIGS. 3A and 3B, and other implementations are within the scope of the present invention.

Tags pertaining to user and kernel processes are compiled into a hash table. In determining resource usage, a search is made in this table. Such a search uses process identification as a key. The tags associated with an entry that matches the key tell about the type of resources consumed by the process. Alternately, a search based on a tag that represents a resource will provide information about the consumers that have consumed the resource. The tags storing information relating to the kernel resource usage can now be searched to generate a table, such as the hash table, with specified search terms, such as a specific user process identifier or a kernel process identifier. An exemplary data structure of a hash table is shown in FIG. 4 and indicated generally at 400. In this example, a hash table is used to facilitate efficient searches for tags associated with particular user processes. Furthermore, a hash table can be set up to search by kernel resource allocation or type. Using specified tagged information from the tag, such as an amount of resources allocated, a type of resource (e.g., File objects), or the user process identifier 314, as a key, the usage information relating to each key is generated as a value in the hash table. Since a second word has been added to the tag, searching for a tag will now require processing two tag words (e.g., the first word and the second word) instead of one tag word. Either one or two word(s) can be used to generate a hash table for indexing resource usage information by a user or kernel process. As a result, a search for resource consumption or type by either the user or kernel process can be made. Based on such searches, valuable resource consumption information can be gathered. The information can then be used for control and management of the kernel resource usage, which helps in providing a more reliable and robust operating environment for all processes.

In the exemplary table shown, the hash table includes three columns of information, specifically columns for saving the tags 402, the amount of the kernel resources allocated in bytes to the process of the tag 404, and the type of kernel resources allocated to the process 406. Using information from the hash table, the usage of the kernel resources can be easily tracked back to the processes allocated with the resources. As a result, the usage kernel resources can be managed and maintained. The table is shown as an example in the form of a hash table, but other tables can also be used and implemented for searching the tags. It should be understood that other table implementations are contemplated and will be readily appreciated by one skilled in the art in view of the present disclosure.

Figure 5:
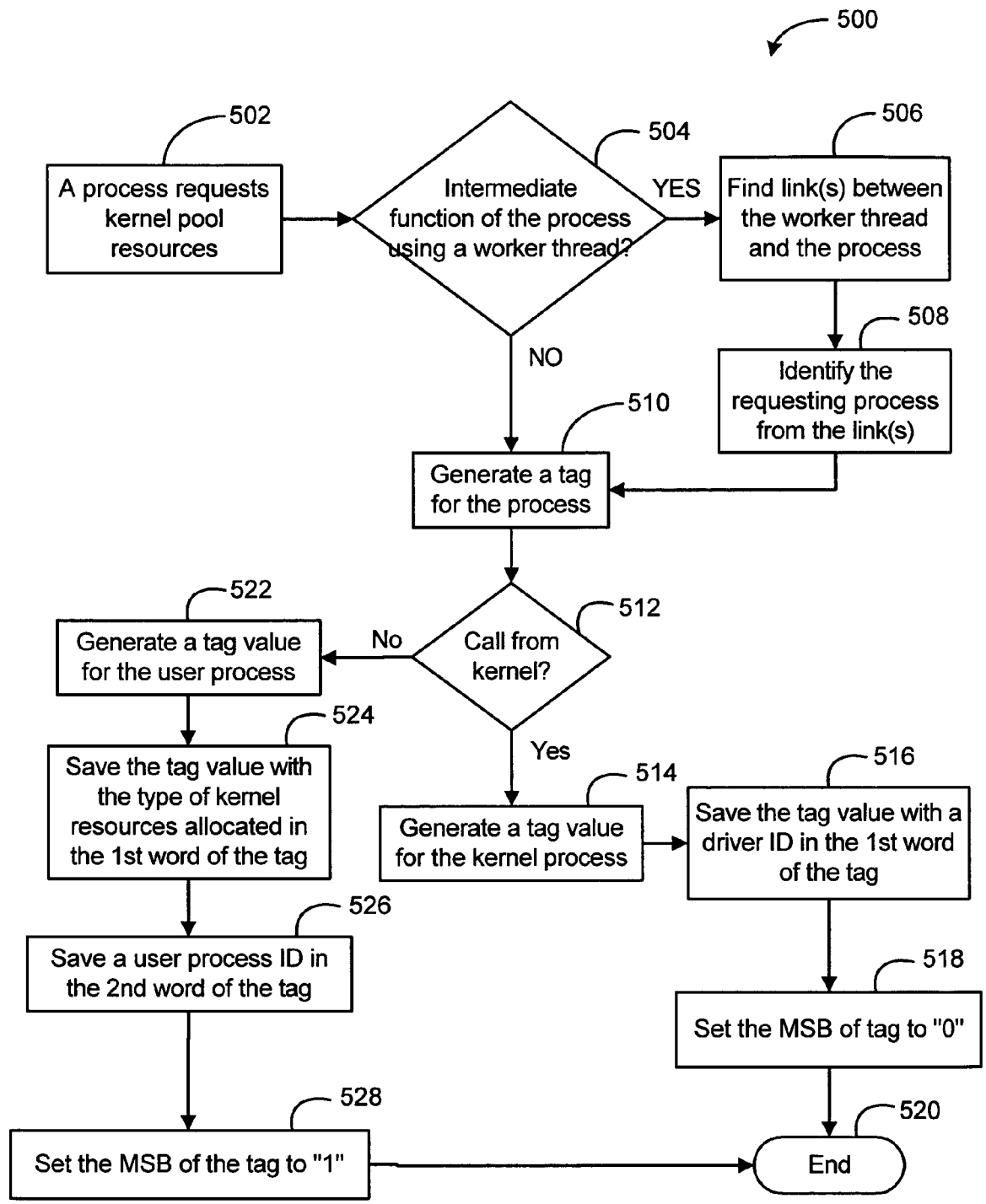
FIG. 5 is a flowchart summarizing a set of steps for tracking kernel resource usage according to one embodiment of the present invention.

Turning now to FIG. 5, a flowchart summarizing a set of steps for tracking kernel resource usage according to an embodiment of the present invention is shown and indicated generally at 500. The steps summarized herein below represent an exemplary implementation with the data structure shown in FIGS. 3A and 3B. Moreover, in the Windows® operating system implementation, the "ExAllocatePoolWithTag" function 210 is modified to perform the steps summarized in the flow chart. However, the steps shown can be modified and altered for other various implementations, and one skilled in the art would appreciate these alternative methods in view of the disclosure contained herein.

The method is initiated by a request from a process for kernel resources during step 502. In a particular embodiment in the Windows® operating system, the process that initiates the "ExAllocatePoolWithTag" function 210 is traced to identify the process requesting the kernel resources. Generally, the process that initiated the function 210 directly relates to the request for kernel resources. In other words, the process that initiated function 210 is the actual process that is requesting kernel resources, and thus it should be charged for the allocated kernel resources. However, in some cases although the request is generated from a user process, the request is passed on to underlying kernel processes. In this case, a worker thread is used by the kernel processes. Instead, an intermediate function (e.g., the kernel process) that actually called the "ExAllocatePoolWithTag" function 210 is traced, rather than the actual user process that requested the kernel resources. As a result, the request to the function 210 indirectly relates to the process that actually requested the kernel resources. In order to trace back to the user process, a reference to the user process along a chain of the worker threads is maintained to correctly charge the consuming user process.

To account for the worker thread situation described, step 504 determines whether the request is passed from an intermediate function using a worker thread. If a worker thread is used, step 506 finds the link(s) between the worker thread and the process. At step 508, the requesting process is identified from the links found at step 506. In other words, by going through the link(s), the identity of the process that initially requested the kernel resources can be determined. On the other hand, if no worker thread is determined from step 504, the process then directly relates to the request.

Once the process that is related to the request is identified, step 510 generates a tag to charge the process that requested the kernel resources. Since both the kernel process and the user process are tracked in the present invention, step 512 determines whether the call is from a kernel process. In other words, at step 512, it is determined whether the process requesting kernel resources is a kernel process from the kernel level or a user process from the user level. If the process is from the kernel level, step 514 generates a tag value for the kernel process with a driver identification, which is saved to the first word of the tag at step 516. A value of "0" is also set at a most significant bit ("MSB") of the tag at step 518 to indicate a kernel process, and the process ends at step 520. In this particular embodiment, the kernel process tag has only a single word.

The user process, on the other hand, has two words in the tag. In the case of the user process, it would be determined that the call is not from the kernel level at step 512. In response, a tag value, which includes the type of kernel resources allocated, of the user process will be generated at step 522. The tag value with the type of kernel resources allocated is saved in the first word of the tag at step 524, and at step 526, a user process identifier is saved in the second word of the tag. At step 528, the MSB of the tag is set to a value of "1" to indicate that the requesting process is a user process. The process ends at step 520.

Figure 6:
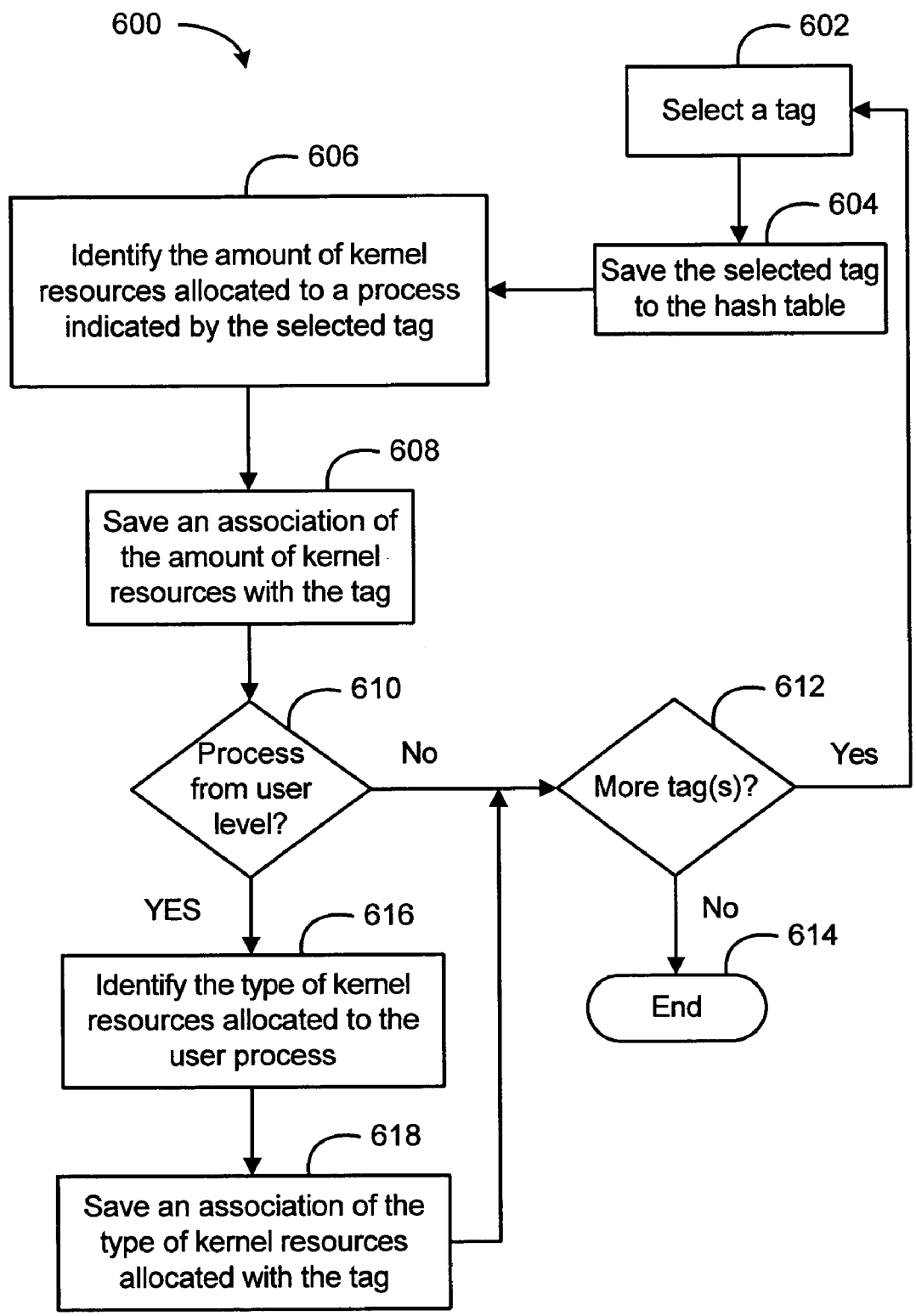
FIG. 6 is a flowchart summarizing a set of steps for generating a hash table according to one embodiment of the present invention.

Turning now to FIG. 6, a flowchart summarizing a set of steps for generating an exemplary hash table is shown and indicated generally at 600. From the tag(s) generated in FIG. 5, the process starts by selecting a tag at step 602. It should be noted that the hash table can be concurrently generated with the tags. In other words, once a tag is generated, the tag can be automatically saved to a hash table with the tracking information associated with the process of the tag. As the tags are being generated, they can be added to the hash table. Similarly, if the kernel resources have been deallocated, the tags can be deleted from the hash table. As a result, the hash table can be dynamically updated with usage changes of the kernel resources. Moreover, other information can be included or excluded in the hash table. These variations are readily appreciated by the one skilled in the art, and thus they are within the scope of the present invention.

In the embodiment shown, once a tag is selected at 602, it is saved to a hash table at 604. Step 606 then identifies the amount of kernel resources allocated to the process indicated by the selected tag, and an association between the amount of kernel resources allocated is saved with the tag or process at step 608. Since the user process tag contains more information about the process than the kernel process tag, step 610 determines whether the process is from the user process. According to the data structure shown in FIGS. 3A and 3B, this information can be easily obtained from the selected tag by referring to the MSB of the tag. Specifically, a value of "1" in the MSB indicates a user process. If, however, the MSB indicates a value of "0," the process relating to the selected tag is not a user process and step 612 determines next whether there are more tag(s) in the system. If so, the process reloops to step 602 to select a next tag in the system, and the process is repeated until there are no more tags or all the tags have been added to the hash table. The process will then end at this point at step 614.

If, at step 610, the process is from the user level, step 616 identifies the type of kernel resources allocated to the user process, which is indicated by the tag value. From the information identified at step 616, an association between the type of kernel resources allocated and the tag or user process is saved to the hash table at step 618. The process continues to step 612 to determine whether there are any more available tags. If so, another tag is selected at 602. Otherwise, the process ends at step 614.

Figure 7:
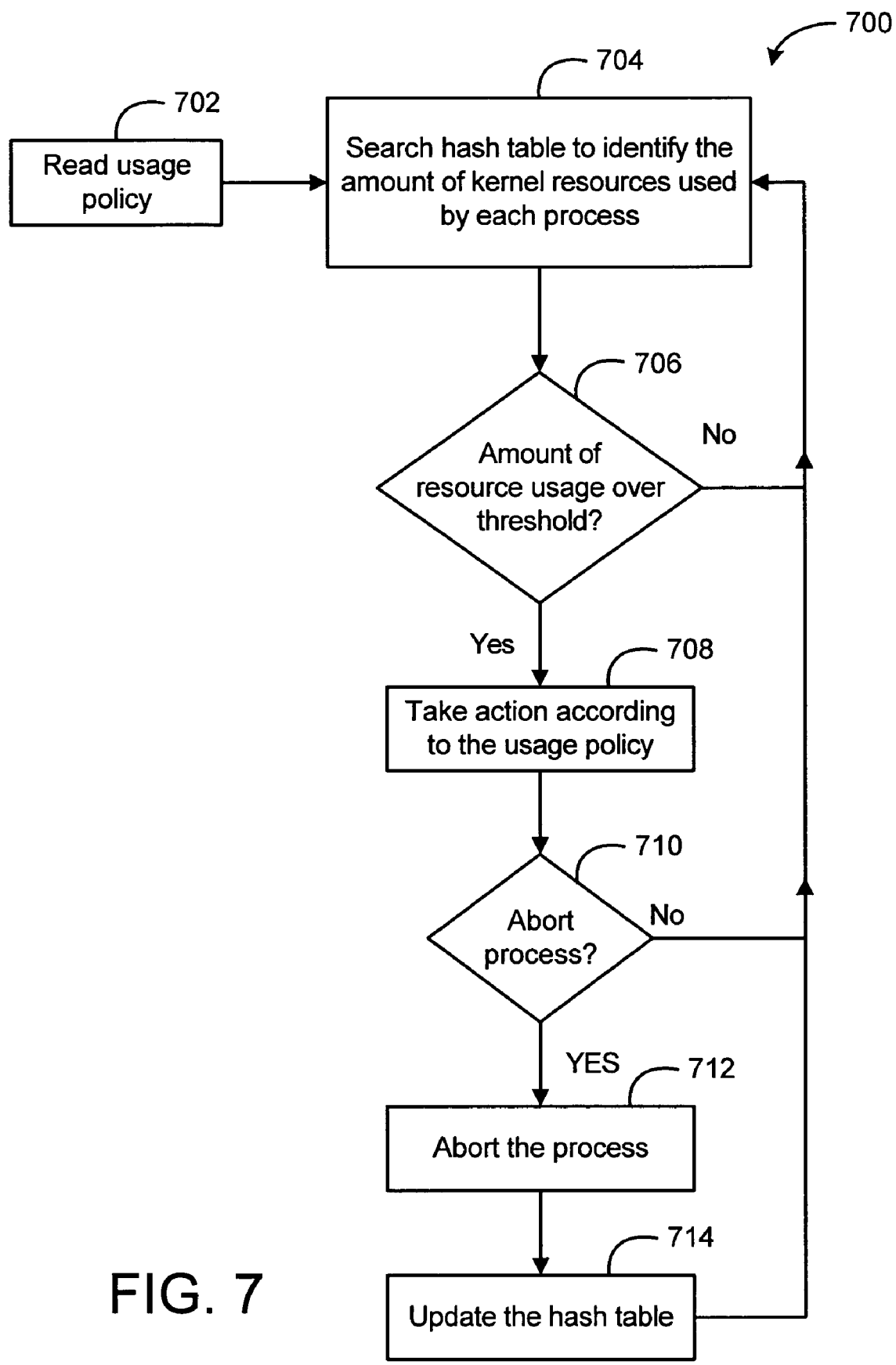
FIG. 7 is a flowchart summarizing a set of steps for managing the kernel resource usage according to one embodiment of the present invention.

FIG. 7 shows a flowchart summarizing a set of steps for managing the kernel resource usage, which is indicated generally at 700. As an example, the process shown in FIG. 7 uses the information collected in the hash table generated in FIG. 6. However, similar to other implementations of the hash tables, other processes for managing the kernel usage can be implemented and are readily appreciated by one skilled in the art. The process starts by reading a usage policy that, for example, includes information relating to allowable threshold limits in usage of the process or the type of kernel resources allocated. Moreover, any specific actions in cases when the allowable thresholds are exceeded can also be included with the usage policy. The various designs of the usage policy are readily appreciated by one skilled in the art.

In the current embodiment shown, the process starts by reading the usage policy at step 702. Once the necessary information has been gathered from the usage policy, the hash table is searched to identify the amount of the kernel resources used by each process at step 704. It is then determined, at step 706, whether there is an amount of kernel resource usage that exceeds the threshold limits defined in the usage policy. If not, the process loops to step 704 to search the hash table again.

If, however, the hash table does indicate an amount of resource usage that exceeds the threshold limit defined in the usage policy at step 706, proper action according to the usage policy will be taken to correct such usage of the kernel resources at step 708. These actions include, for example, notification to the users or deallocation of the kernel resources. Step 710 further determines whether the process using the kernel resources should be aborted according to the usage policy. If the process does not need to be aborted at step 710, the process again reloops to step 704 to search the hash table. If the process should be aborted at step 710, it is aborted at step 712, and the hash table will be updated to reflect the change in the kernel usage at step 714. Specifically, the tag of the aborted process will be deleted from the hash table. Once the hash table is updated at step 714, the process loops to step 704 to search the hash table to repeat the process.

It will be appreciated by those skilled in the art that a new and useful method and system has been described for tracking kernel resource usage. In view of the many possible environments in which the principles of this invention may be applied and the flexibility of designing and carrying out software utilities and tools, it should be recognized that the embodiments described herein are meant to be illustrative and should not be taken as limiting the scope of the invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for tracking kernel resource usage comprising:
generating a tag to charge a process allocated with kernel resources wherein generating a tag further comprises:
determining whether a request for kernel resources is passed from an intermediate function using a worker thread;
finding at least one link between the worker thread and the process; and,
identifying the process that originated the request according to the found link between the worker thread and the process;
determining whether the process is a kernel process;
determining whether the process is a user process;
flagging the tag with a kernel flag to indicate whether the process has been determined to be a kernel process, the flagging further comprising:
generating a tag value to identify kernel resources allocated to a user process;
saving a type of kernel resources allocated to the tag; and,
saving a user process identifier to the tag to identify the process;
flagging the tag with a user flag to indicate whether the process has been determined to be a user process based upon the determination step wherein the tag value and the type of kernel resources are saved in a first word of the tag, and the user process identifier is saved in a second word of the tag;
determining whether the process is a first predefined process or a second predefined process;
saving an identifier to the tag to identify whether the process is a first predefined process or a second predefined process based upon the determination step;
determining whether the process has used more kernel usage than a threshold; and if the process kernel usage is above a threshold, aborting the process.

2. The method of claim 1 wherein flagging the tag further comprises the steps of:
- generating a tag value to identify the kernel resources allocated to a kernel process; and,
- saving a driver identification to the tag value.

3. The method of claim 2 wherein the tag value with the driver identification is saved in a first word of the tag.

4. The method of claim 1 wherein flagging the tag further comprises:
- generating a tag value to identify kernel resources allocated to a user process;
- saving the tag value to a first word of the tag; and,
- saving a user process identifier to identify the process to a second word of the tag.

5. A computer storage medium having computer-executable instructions to be executed by a processor for performing a method for tracking kernel resource usage comprising:
- generating a tag to charge a process allocated with kernel resources wherein generating a tag further comprises:
  - determining whether a request for kernel resources is passed from an intermediate function using a worker thread;
  - finding at least one link between the worker thread and the process; and,
  - identifying the process that originated the request according to the found link between the worker thread and the process;
- determining whether the process is a kernel process;
- determining whether the process is a user process;
- flagging the tag with a kernel flag to indicate whether the process has been determined to be a kernel process, the flagging further comprising:
  - generating a tag value to identify kernel resources allocated to a user process;
  - saving a type of kernel resources allocated to the tag; and,
  - saving a user process identifier to the tag to identify the process;
- flagging the tag with a user flag to indicate whether the process has been determined to be a user process based upon the determination step wherein the tag value and the type of kernel resources are saved in a first word of the tag, and the user process identifier is saved in a second word of the tag;
- determining whether the process is a first predefined process or a second predefined process;
- saving an identifier to the tag to identify whether the process is a first predefined process or a second predefined process based upon the determination step;
- determining whether the process has used more kernel usage than a threshold; and
- if the process kernel usage is above a threshold, aborting the process.

6. The computer storage medium of claim 5, wherein flagging the tag further comprises the steps of:
- generating a tag value to identify the kernel resources allocated to a kernel process; and saving a driver identification to the tag value.

7. The computer storage medium of claim 6, wherein the tag value with the driver identification is saved in a first word of the tag.

8. The computer storage medium of claim 7, wherein flagging the tag further comprises of:
- generating a tag value to identify kernel resources allocated to a user process;
- saving the tag value to a first word of the tag; and
- saving a user process identifier to identify the process to a second word of the tag.

9. The computer storage medium of claim 5, further comprising:
- saving a process identifier to identify the process allocated with the kernel resources; and
- saving a type of kernel resources allocated to the process.

* * * * *